United States Patent
Poole et al.

(10) Patent No.: US 11,886,285 B2
(45) Date of Patent: Jan. 30, 2024

(54) CROSS-CORRELATION OF METRICS FOR ANOMALY ROOT CAUSE IDENTIFICATION

(71) Applicant: eBay Inc., San Jose, CA (US)

(72) Inventors: Maxwell Henry Poole, San Jose, CA (US); Satish Sambasivan, Cupertino, CA (US); Vivek Siva Kaushik, Pleasanton, CA (US)

(73) Assignee: eBay Inc., San Jose, CA (US)

( * ) Notice: Subject to any disclaimer, the term of this patent is extended or adjusted under 35 U.S.C. 154(b) by 8 days.

(21) Appl. No.: 17/843,198

(22) Filed: Jun. 17, 2022

(65) Prior Publication Data
US 2022/0325392 A1  Oct. 13, 2022
US 2023/0359519 A9  Nov. 9, 2023

Related U.S. Application Data

(63) Continuation of application No. 16/355,042, filed on Mar. 15, 2019, now Pat. No. 11,392,446.

(51) Int. Cl.
*G06F 11/07* (2006.01)

(52) U.S. Cl.
CPC ...... *G06F 11/0793* (2013.01); *G06F 11/0706* (2013.01)

(58) Field of Classification Search
CPC . G06F 11/0706; G06F 11/079; G06F 11/0793
See application file for complete search history.

(56) References Cited

U.S. PATENT DOCUMENTS

| | | | |
|---|---|---|---|
| 7,523,016 B1 | 4/2009 | Surdulescu et al. | |
| 7,716,011 B2 | 5/2010 | Thibaux et al. | |
| 7,836,356 B2 * | 11/2010 | Haas | G06F 11/008 |
| | | | 714/47.1 |
| 8,661,299 B1 | 2/2014 | Ip | |
| 9,396,061 B1 | 7/2016 | Nair | |
| 2020/0293391 A1 | 9/2020 | Poole et al. | |

OTHER PUBLICATIONS

U.S. Appl. No. 16/355,042 , "Non-final Office Action received for U.S. Appl. No. 16/355,042, dated Dec. 6, 2021", Dec. 6, 2021, 20 Pages.
U.S. Appl. No. 16/355,042 "Notice of Allowance", U.S. Appl. No. 16/355,042, filed Mar. 30, 2022, 11 pages.

(Continued)

*Primary Examiner* — Joseph R Kudirka
(74) *Attorney, Agent, or Firm* — FIG. 1 Patents

(57) ABSTRACT

Technologies are disclosed herein for cross-correlating metrics for anomaly root cause detection. Primary and secondary metrics associated with an anomaly are cross-correlated by first using the derivative of an interpolant of data points of the primary metric to identify a time window for analysis. Impact scores for the secondary metrics can be then be generated by computing the standard deviation of a derivative of data points of the secondary metrics during the identified time window. The impact scores can be utilized to collect data relating to the secondary metrics most likely to have caused the anomaly. Remedial action can then be taken based upon the collected data in order to address the root cause of the anomaly.

20 Claims, 7 Drawing Sheets

(56) References Cited

OTHER PUBLICATIONS

Dave, Hale, "An efficient method for computing local cross-correlations of multi-dimensional signals", Center for Wave Phenomena (CWP), Colorado School of Mines, Golden CO 80401, USA, Retrieved from Internet URL: <https://inside.mines.edu/~dhale/papers/Hale06LocalCrossCorrelations.pdf>, 2006, 8 Pages.

Tarango, et al., "Accelerating the Dynamic Time Warping Distance Measure using Logarithmetic Arithmetic", 48th Asilomar Conference on Signals, Systems and Computers, doi: 10.1109/ACSSC.2014.7094472, 2014, 5 Pages.

Wkipedia, "Granger Causality", Accessed on Dec. 27, 2018, 6 Pages.

Zaharia, et al., "Quantized Dynamic Time Warping (DTW) algorithm", 2010 8th International Conference on Communications, doi: 10.1109/ICCOMM.2010.5509068., 2010, 4 Pages.

* cited by examiner

CROSS-CORRELATION OF METRICS FOR ANOMALY ROOT CAUSE IDENTIFICATION

RELATED APPLICATION

This application is a continuation of and claims priority to U.S. patent application Ser. No. 16/355,042, filed Mar. 15, 2019, entitled "Cross-Correlation Of Metrics For Anomaly Root Cause Identification," the disclosure of which is hereby incorporated by reference in its entirety.

BACKGROUND

Anomaly detection is a data-mining technique for identifying unusual patterns in data that do not conform to expected behavior. In the computing domain, anomaly detection is commonly utilized to identify incidents impacting the operation of computing devices or network components (which might be referred to herein as "information technology ("IT") infrastructure components"). For example, anomaly detection might be utilized to identify unusual patterns in network traffic that indicate unauthorized access to infrastructure components.

Anomaly detection techniques commonly utilize supervised or unsupervised machine learning ("ML") and statistical methods. For example, supervised ML techniques for anomaly detection utilize training data that describes historical anomalies and corresponding values for audited metrics to identify anomalies. Other types of ML and non-ML techniques can be utilized to identify anomalies.

A root-cause analysis ("RCA") is commonly performed following the detection of an anomaly. RCA is a systematic process for identifying root causes of anomalies. RCA can be very complex, particularly in scenarios where there are hundreds or even thousands of potential underlying causes for an anomaly and signals describing them. For instance, in the computing domain, an anomaly detected with respect to a network service might be caused by other network services or software components, server hardware, networking components, or other causes. As a result, the root causes of anomalies might go undetected and, consequently, the performance of infrastructure devices associated with the anomalies might be negatively impacted.

It is with respect to these and other technical considerations that the disclosure made herein is presented.

SUMMARY

Technologies are disclosed herein for cross-correlating metrics for anomaly root cause detection. The disclosed technologies address the technical problems presented above, and potentially others, by cross-correlating primary and secondary metrics associated with an anomaly by using the derivative of an interpolant of data points of the primary metric to identify a time window for analysis. Impact scores for the secondary metrics can be then be generated by computing the standard deviation of a derivative of data points of the secondary metrics during the time window. The impact scores can be utilized to collect data relating to the secondary metrics most likely to have caused the anomaly. Remedial action can be taken based upon the collected data in order to address the identified root cause of the anomaly.

Through implementations of the disclosed technologies, the root causes of anomalies can be identified more quickly and accurately than by previous solutions, thereby improving the reliability, availability, and performance of components impacted by anomalies. Further, data accuracy is improved because components with anomalies may be identified early and any errors corrected. Still further, the analysis of interpolants may be conducted using less memory and less data preparation than other techniques for anomaly detection, such as those requiring machine learning. Anomalies can be identified and corrected quickly using the disclosed technologies and thereby improve the reliability and availability of components compared to other techniques for identifying anomalies. Other technical benefits not specifically mentioned herein can also be realized through implementations of the disclosed technologies.

In order to provide the technical benefits described above, and potentially others, the technologies disclosed herein utilize a root cause identification component. The root cause identification component can receive an indication that an anomaly has occurred with respect to an infrastructure component from an anomaly detection system such as that described above. The indication can identify a primary metric that is indicative of the anomaly. The indication can also identify secondary metrics. The secondary metrics are metrics potentially related to the cause of the anomaly indicated by the primary metric. The primary and secondary metrics can be machine metrics, business metrics, or another type of metric.

Responsive to receiving an indication of an anomaly, the root cause identification component retrieves a primary dataset and secondary datasets. The primary dataset includes data points for the primary metric around the time that the anomaly occurred. The secondary datasets include data points for the secondary metrics.

Once the primary and secondary datasets have been obtained, the root cause identification component computes an interpolant for the data points in the primary dataset. In one embodiment, the interpolant for the primary dataset is computed by fitting a piecewise cubic polynomial through the data points for the primary metric.

Once the interpolant for the primary dataset has been computed, the root cause identification component analyzes the interpolant's derivative to identify a time window. In one embodiment, the time window is identified by evaluating roots of a derivative of the interpolant for the primary dataset. The time window identifies a portion of time during which impact scores are to be computed for data points in the secondary datasets.

Once the time window has been identified, the root cause identification component computes interpolants for data points of the secondary datasets that are located within the time window. In one embodiment, the interpolants for the secondary datasets are computed by fitting a piecewise cubic polynomial through the data points of the secondary metrics.

The root cause analysis component can then compute an impact score for each of the secondary metrics by analyzing the interpolants for the plurality of second datasets. In one embodiment, for example, the impact scores can be computed as the standard deviation of derivatives of the interpolants for the second metrics during the time window.

Data can be selected for use in identifying a cause of the anomaly based upon the impact scores. Remedial action can then be taken to address the anomaly based upon the collected data. For example, and without limitation, impacted infrastructure components might be restored to their most recent healthy state, rebooted, initialized, or otherwise reconfigured. Other types of remedial action can also be taken based upon the particular root cause of an anomaly.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

The following Detailed Description presents technologies for cross-correlating metrics for anomaly root cause detection. As discussed briefly above, and in greater detail below, the disclosed technologies can cross-correlate metrics for use in anomaly root cause detection. In particular, primary and secondary metrics associated with an anomaly can be cross-correlated using the derivative of an interpolant of data points of the primary metric to identify a time window for analysis. Impact scores for the secondary metrics can be then be generated by computing the standard deviation of a derivative of data points of the secondary metrics during the identified time window. The impact scores can be utilized to collect data relating to the secondary metrics, and remedial action can then be taken based upon the collected data in order to address the root cause of the anomaly. Technical benefits other than those specifically mentioned herein might also be realized through implementations of the disclosed technologies.

It is to be appreciated that while the technologies disclosed herein are primarily described in the context of identifying the root causes of anomalies impacting an IT infrastructure, the technologies described herein can be utilized to identify the root causes of anomalies in other types of systems and data in other configurations, which will be apparent to those of skill in the art.

Referring now to the appended drawings, in which like numerals represent like elements throughout the several FIGS., aspects of various technologies for cross-correlating metrics for anomaly root cause detection will be described. In the following detailed description, references are made to the accompanying drawings that form a part hereof, and which are shown by way of illustration specific configurations or examples.

Figure 1:
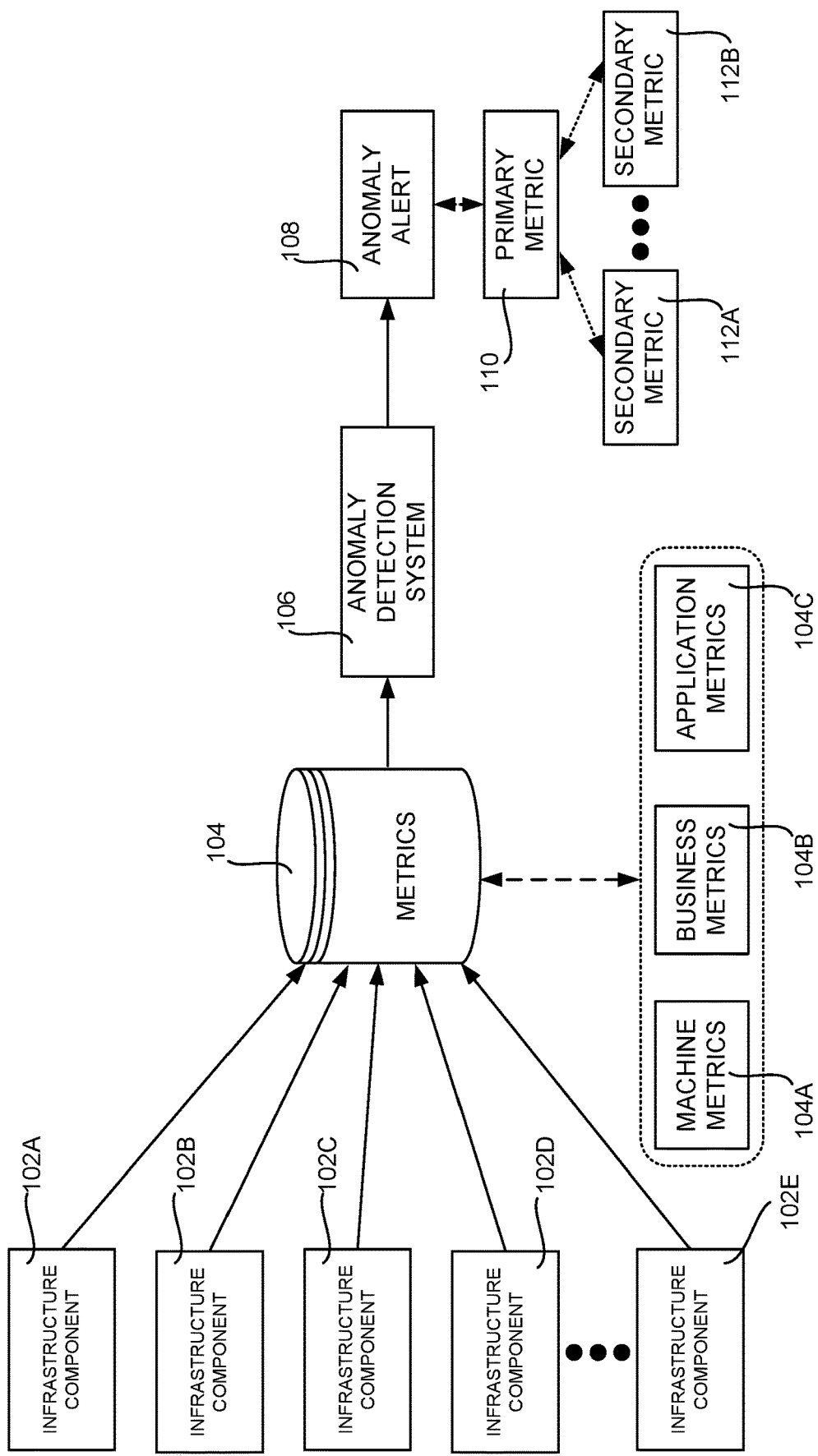
FIG. 1 is a computing system architecture diagram showing an overview of a system disclosed herein for cross-correlating metrics for anomaly root cause detection, according to one embodiment disclosed herein.

FIG. 1 is a computing system architecture diagram showing an overview of a system disclosed herein for cross-correlating metrics for anomaly root cause detection, according to one embodiment disclosed herein. In particular, the computing system shown in FIG. 1 is configured to identify infrastructure anomalies based upon metrics 104 generated by infrastructure components 102A-102E (which might be referred to individually as an "infrastructure component 102" or collectively as the "infrastructure components 102"). The infrastructure components 102 can include, but are not limited to, computing hardware platforms such as server computers and associated hardware components (e.g. memory and mass storage devices), networking platforms (e.g. routers, switches, and cables), and software platforms, such as operating systems, applications, and network services.

As discussed briefly above, anomaly detection is a data-mining technique for identifying unusual patterns in data that do not conform to expected behavior. In the computing domain, anomaly detection is commonly utilized to identify incidents impacting infrastructure components such as those identified above. For example, anomaly detection might be utilized to identify unusual patterns in network traffic that indicate unauthorized access to infrastructure components.

In the example system shown in FIG. 1, an anomaly detection system 106 utilizes metrics 104 obtained from infrastructure components 102 to identify anomalies. The metrics 104 can include machine metrics 104A, business metrics 104B, application metrics 104C, and other types of metrics. Machine metrics 104A describe aspects of the operation of hardware components such as, but not limited to, metrics describing processor utilization, memory utilization, network utilization, error counts, transactions per second ("TPS"), |JAVA garbage collection overhead ("JG-COVH"), and load balancer stacked connections.

Business metrics 104B include, but are not limited to, metrics describing aspects of the operation of business services provided by the infrastructure components 102 such as, for example, the number of e-commerce sales processed by the infrastructure components 102 for a particular geographic region within a particular time period. Application metrics 104C are metrics describing the operation of an application or other type of software component such as, for example, the number of requests processed by an application per a specified time period. The metrics 104 can include other types of metrics generated by other types of components in other configurations.

In some configurations, the anomaly detection system 106 utilizes supervised and/or unsupervised machine learning ("ML") and/or statistical methods to identify anomalies. For example, the anomaly detection system 106 might utilize supervised ML techniques by training on data that describes historical infrastructure anomalies and corresponding values for audited metrics 104 to identify anomalies. The anomaly detection system 106 can utilize other types of ML and non-ML techniques to identify anomalies in other configurations.

As also discussed above, root cause analysis ("RCA") is commonly performed following the detection of an anomaly. RCA is a systematic process for identifying root causes of anomalies. RCA can be very complex, particularly in scenarios where there are hundreds or even thousands of potential underlying causes for an anomaly and metrics 104 describing them. For instance, in the computing domain, an anomaly detected with respect to a particular infrastructure component 102 might be caused by other network services or software components, server hardware, networking components, or other causes. As a result, the root causes of anomalies might go undetected and, consequently, the performance of infrastructure components 102 associated with the anomalies might be negatively impacted. The technologies disclosed herein address these and potentially other technical considerations.

In order to enable aspects of the functionality disclosed herein, the anomaly detection system 106 can generate an anomaly alert 108 following the detection of an anomaly. The anomaly alert 108 can include various types of data, including data identifying the anomaly. The anomaly alert 108 can also include data identifying a primary metric 110. The primary metric 110 is a metric 104 that indicates the present of an anomaly. The anomaly alert 108 can also include data identifying secondary metrics 112A-112B. The secondary metrics 112 are metrics potentially related to the cause of the anomaly indicated by the primary metric 110. The primary metric 110 and secondary metrics 112 might be machine metrics 104A, business metrics 104B, application metrics 104C, or other types of metrics 104. As will be described in greater detail below, the disclosed technologies can utilize the contents of the anomaly alert 108 to perform aspects of a RCA.

Figure 2:
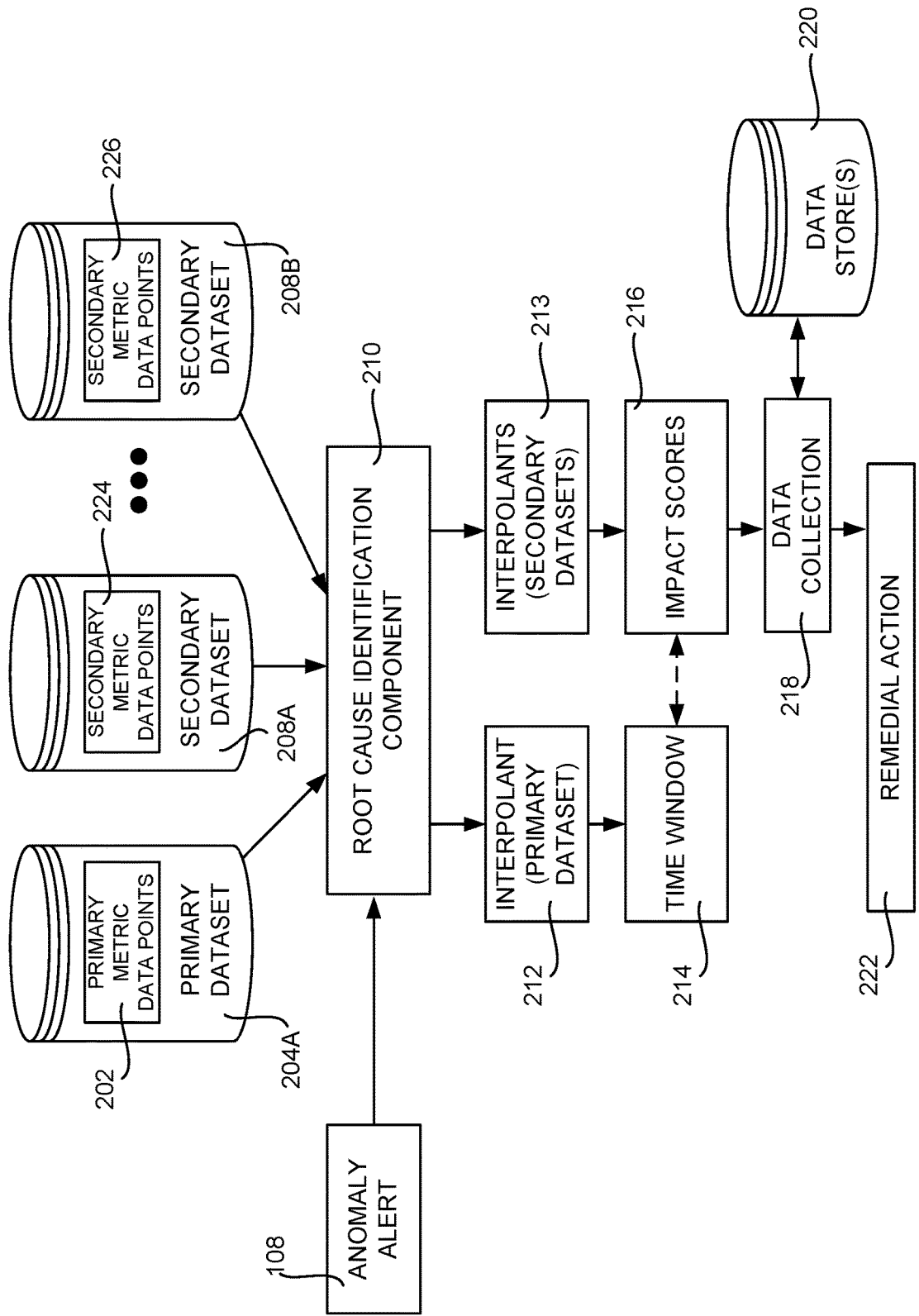
FIG. 2 is a computing system architecture diagram showing additional aspects of the operation of the system illustrated in FIG. 1 for cross-correlating metrics for anomaly root cause detection, according to one embodiment disclosed herein.

FIG. 2 is a computing system architecture diagram showing additional aspects of the operation of the system illustrated in FIG. 1 for cross-correlating metrics for anomaly root cause detection, according to one embodiment disclosed herein. FIG. 2 will be described in conjunction with FIGS. 3A-3C, which are scatter plot diagrams showing aspects of the technologies disclosed herein as applied to several sample datasets.

As shown in FIG. 2, a root cause identification component 210 receives an anomaly alert 108 from the anomaly detection system 106 shown in FIG. 1. The root cause identification component 210 might be a software component, a hardware component, or a combination hardware/software component according to various embodiments.

Responsive to receiving the anomaly alert 108, the root cause identification component 210 retrieves a primary dataset 204A and secondary datasets 208A and 208B. The primary dataset 204 includes data points 202 for the primary metric 110 identified by the anomaly alert 108 around the time that the anomaly occurred. The secondary datasets 208A and 208B include data points 224 and 226 for the secondary metrics 112A and 112B, respectively. Although two metrics and corresponding datasets 208A and 208B are utilized in the example described herein, it is to be appreciated that many more secondary metrics can be processed in the manner described herein.

Once the primary dataset 204A and secondary datasets 208A and 208B have been obtained, the root cause identification component 210 computes an interpolant 212 for the data points 202 in the primary dataset 204A. In one embodiment, the interpolant 212 for the primary dataset 204A is computed by fitting a piecewise cubic polynomial through the data points 202 for the primary metric 110.

Figure 3A:
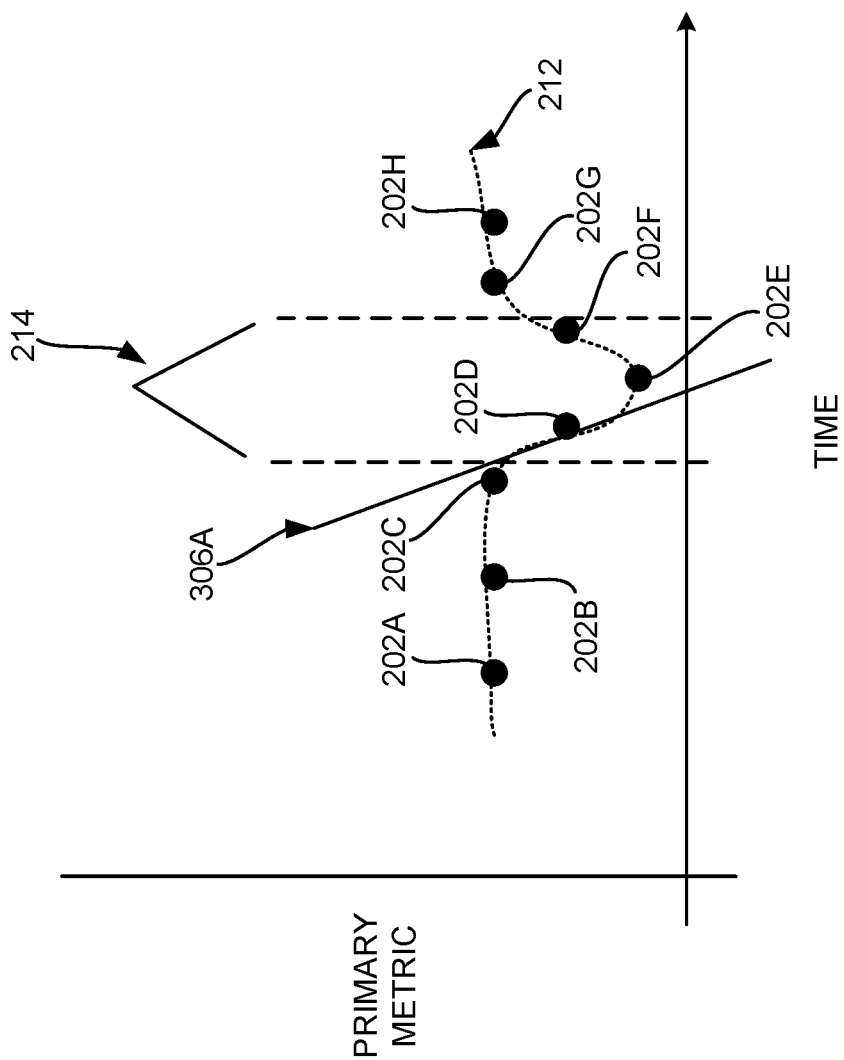
FIGS. 3A-3C are scatter plot diagrams showing aspects of one mechanism disclosed herein for computing interpolants for data points in primary and secondary datasets and for computing impact scores for secondary metrics, according to one embodiment disclosed herein.

The example scatter plot diagram shown in FIG. 3A illustrates data points 202A-202H for a primary metric 110. In the example shown in FIG. 3A, values for the data points 202A-202H have been plotted over time. Additionally, and as described above, an interpolant 212 (represented by the dotted line in FIG. 3A) has been computed by fitting a piecewise cubic polynomial through the data points 202A-202H for the primary metric 110.

Once the interpolant 212 for the primary dataset 204A has been computed, the root cause identification component 210 analyzes the interpolant 212 to identify a time window 214. The time window 214 identifies a portion of time during which impact scores 216 are to be computed for data points 224 and 226 in the secondary datasets 208A and 208B, respectively. In one embodiment, root cause identification component 210 identifies the time window 214 by evaluating roots of derivatives of the interpolant 212 for the primary dataset 204A. The time window 214 can be identified by identifying extreme points in the derivatives of the interpolant 212. Details regarding the computation of the impact scores 216 for the secondary metrics 112 will be provided below.

The example scatter plot diagram shown in FIG. 3A also illustrates aspects of the identification of the time window 214. In the example shown in FIG. 3A, the time window is represented by two dashed lines, one of which represents the start of the time window 214 and the other of which represents the end of the time window 214. FIG. 3A also shows one example derivative 306A of the interpolant 212.

Once the time window 214 has been identified, the root cause identification component 210 computes interpolants 213 for data points 224 and 226 of the secondary datasets 208A and 208B respectively, that are located within the time window 214. In one embodiment, the root cause identification component 210 computes interpolants 213 for the secondary datasets 208A and 208B by fitting a piecewise cubic polynomial through the data points 224 and 226 of the secondary metrics 112A and 112B, respectively.

Figure 3B:
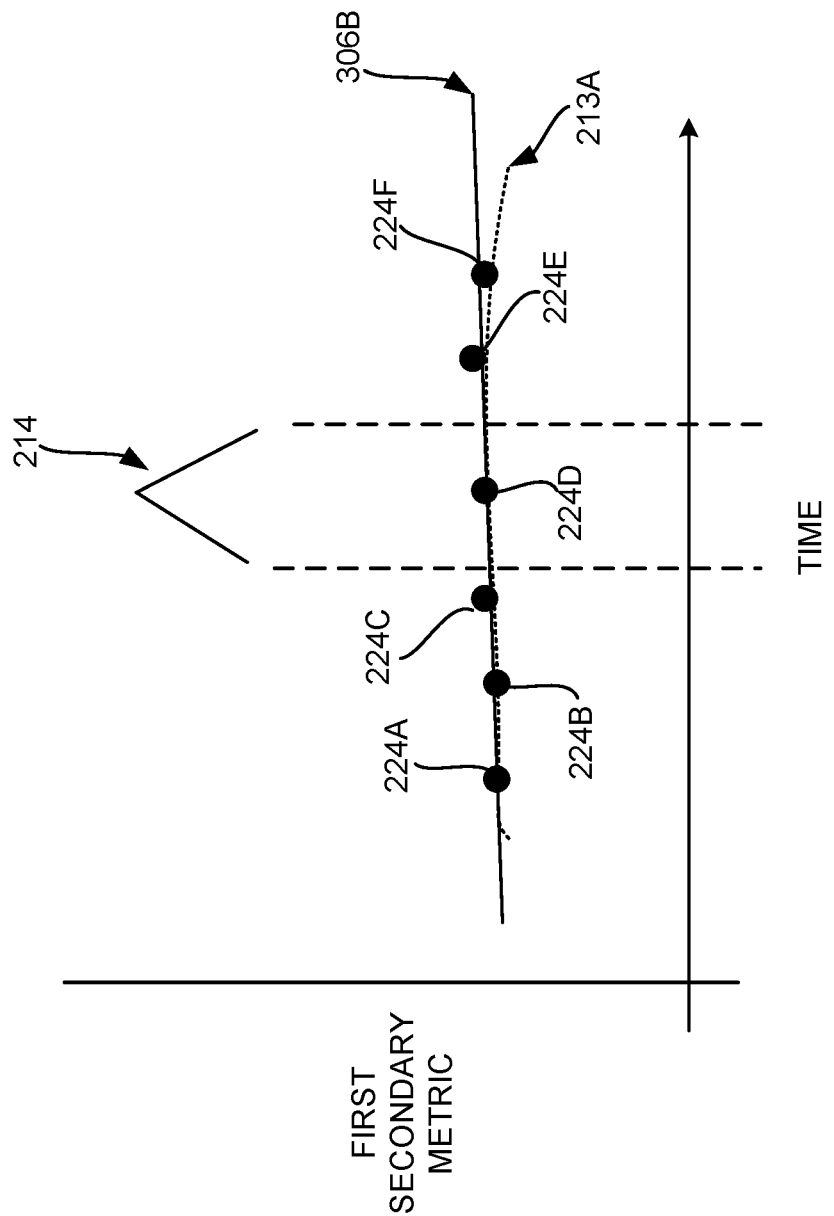

The example scatter plot diagram shown in FIG. 3B illustrates data points 224A-224F for a secondary metric 112A. In the example shown in FIG. 3B, values for the data points 224A-224F have been plotted over time. Additionally, and as described above, the root cause identification component 210 has computed an interpolant 213A (represented by the dotted line in FIG. 3B) by fitting a piecewise cubic polynomial through the data points 224A-224 for the secondary metric 112A.

Figure 3C:
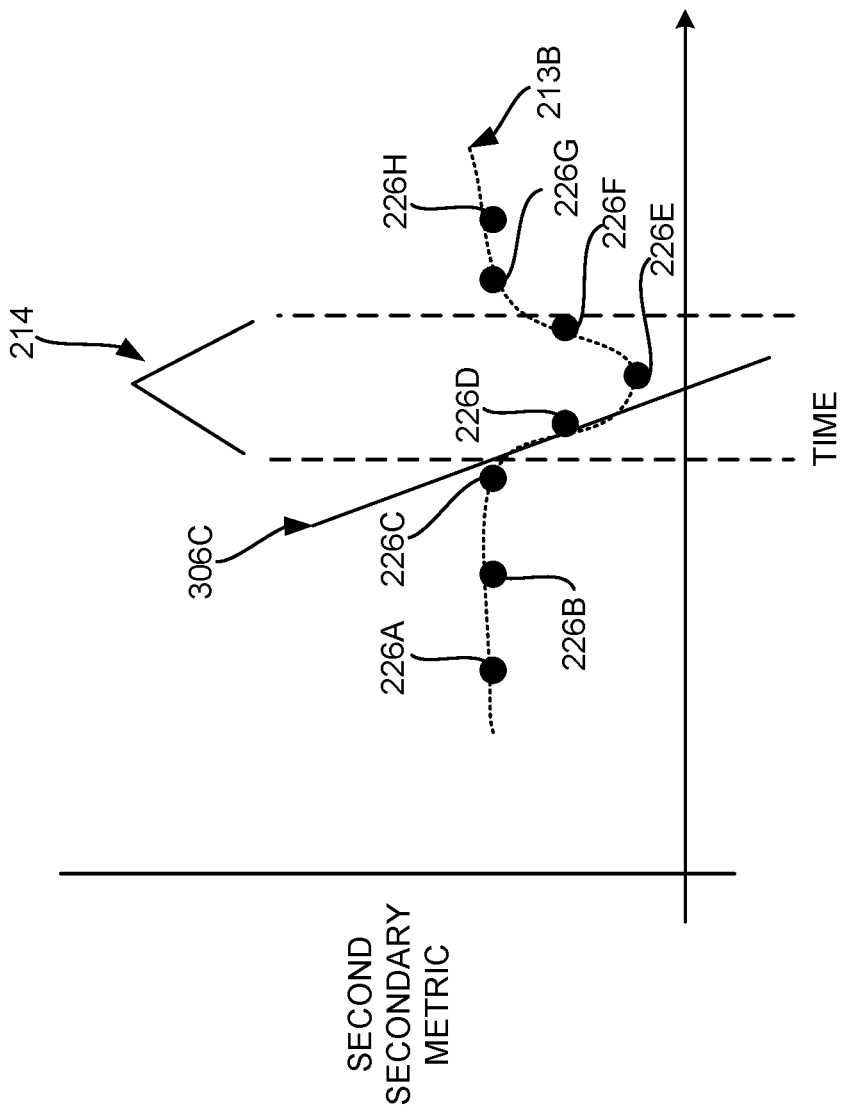

The example scatter plot diagram shown in FIG. 3C illustrates data points 226A-226H for another secondary metric 112B. In the example shown in FIG. 3C, values for the data points 226A-224H have also been plotted over time. Additionally, and as described above, the root cause identification component 210 has computed an interpolant 213B (represented by the dotted line in FIG. 3C) by fitting a piecewise cubic polynomial through the data points 226A-226H for the additional secondary metric 112B.

The root cause analysis component can then compute an impact score 216 for each of the secondary metrics 112A and 112B by analyzing the interpolants 213A and 213B for the data points 224 and 226 in the secondary datasets 208A and 208B, respectively. In one embodiment, for example, the impact scores 216 can be computed as the standard deviation of derivatives of the interpolants 213A and 213B for the second metrics during the time window 214.

The root cause identification component 210 can then perform data collection 218 based upon the impact scores 216. For example, the root cause identification component 210 can select and retrieve data from one or more data stores 220 based upon the impact scores 216. In one particular example, the root cause identification component 210 retrieves data from the data stores 220 for the secondary metrics 112 having the N highest impact scores 216, where N is an integer. The collected data can include, but is not limited to, log files for infrastructure components 102, other metrics, management data for the infrastructure components 102, and/or other information relevant to the identification of an anomaly. The collected data can then be analyzed to identify the root cause of the anomaly detected by the anomaly detection system 106.

Once the root cause of an anomaly has been identified, remedial action 222 can be taken to address the anomaly and prevent future occurrences of similar anomalies. For example, and without limitation, impacted infrastructure components 102, such as server computers, might be restored to their most recent healthy state, rebooted, initialized, or otherwise reconfigured. Remedial action can also include transmitting an alert to a system administrator. In response thereto, the administrator can inspect and take action to address the anomaly, such as those actions described above. Other types of remedial action can be taken to address the anomaly and to prevent future occurrences of the anomaly.

Figure 4:
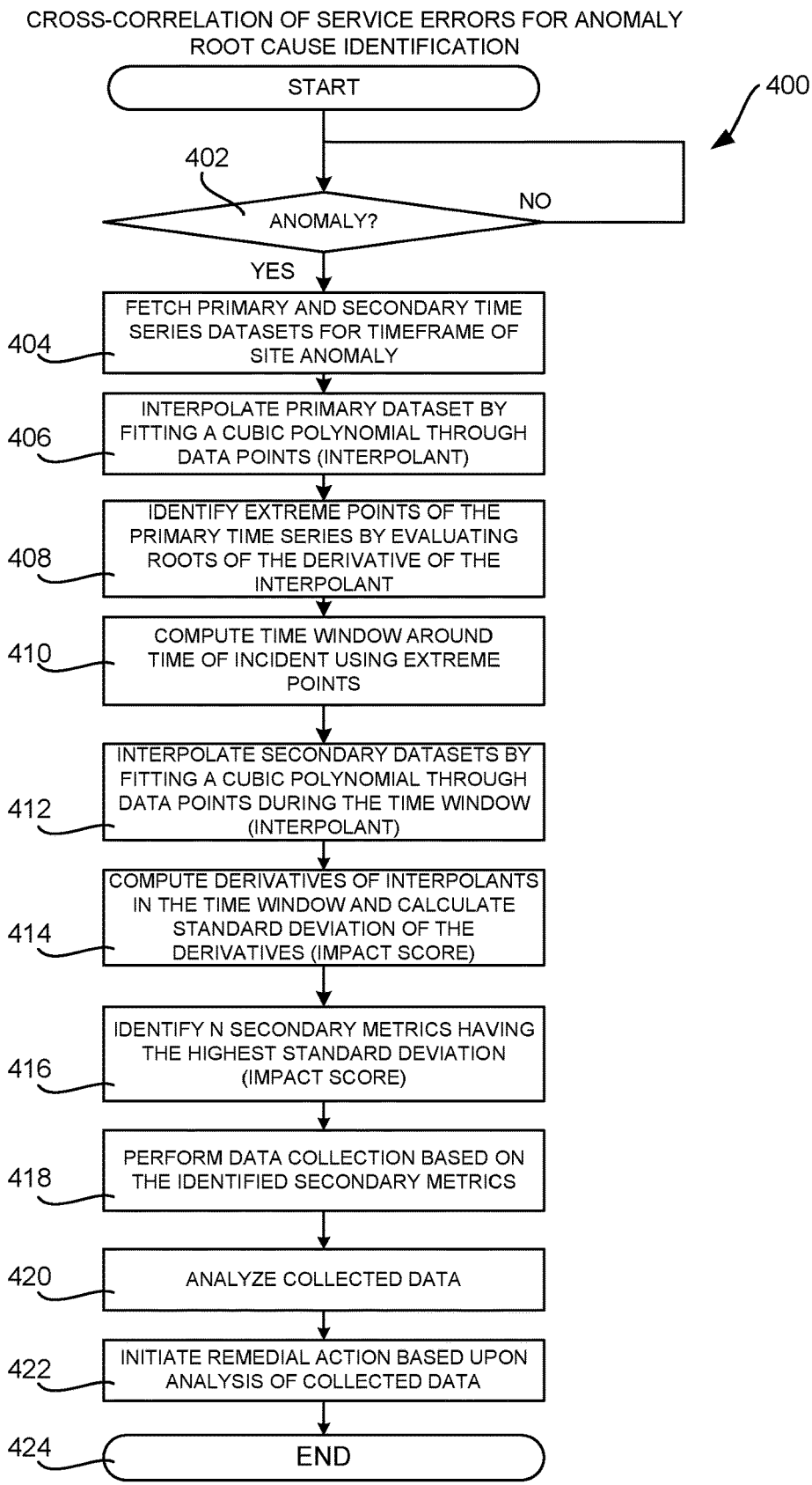
FIG. 4 is a flow diagram showing aspects of an illustrative routine for cross-correlating metrics for anomaly root cause detection, according to one embodiment disclosed herein.

FIG. 4 is a flow diagram showing aspects of a routine 400 for cross-correlating metrics for anomaly root cause detection, according to one embodiment disclosed herein. It should be appreciated that the logical operations described herein with regard to FIG. 4, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 400 begins at operation 402, where the anomaly detection system 106 determines if an anomaly has occurred. As discussed above, the anomaly detection system 106 can utilize various techniques, such as ML, to determine if an anomaly has occurred. If the anomaly detection system 106 detects an anomaly, it generates an anomaly alert 108 identifying the relevant primary metric 110 and secondary metrics 112A and 112B and provides the anomaly alert 108 to the root cause identification component 210. The routine 400 then proceeds from operation 402 to operation 404.

At operation 404, the root cause identification component 210 fetches the data points 202 for the primary metric 110 and the data points 224 and 226 for the secondary metrics 112A and 112B from the datasets 208A and 208B, respectively. The routine 400 then proceeds from operation 404 to operation 406, where the root cause identification component 210 interpolates the data points 202 for the primary metric 110 by fitting a piecewise cubic polynomial through the data points 202 of the primary dataset 204A to generate the interpolant 212. The routine 400 then proceeds from operation 406 to operation 408.

At operation 408, the root cause identification component 210 identifies extreme points of the data points 202 of the primary dataset 204A by evaluating roots of the derivative of the interpolant 212 for the data points 202 of the primary dataset 204A. The routine 400 then proceeds from operation 408 to operation 410, where the root cause identification component 210 computes the time window 214 using the identified extreme points of the derivative of the interpolant 212. The routine 400 then proceeds from operation 410 to operation 412.

At operation 412, the root cause identification component 210 interpolates the data points 224 and 226 of the secondary datasets 208A and 208B, respectively, by fitting a piecewise cubic polynomial through the data points 224 and 226 sampled during the time window 214 to generate the interpolants 213A and 213B, respectively. The routine 400 then proceeds from operation 412 to operation 414, where the root cause identification component 210 computes derivatives of the interpolants 213A and 213B during the time window 214 to compute the impact scores 216.

From operation 414, the routine 400 proceeds to operation 416, where the root cause identification component 210 identifies the N secondary metrics 114 having the highest impact scores 216 (i.e. standard deviation of derivatives of the interpolants 213). The routine 400 then proceeds from operation 316 to operation 418, where the root cause identification component 210 performs data collection 218 based on the N secondary metrics 114.

Once data has been collected at operation 418, the routine 400 proceeds to operation 420, where the collected data is analyzed to identify the root cause of the detected anomaly. The routine 400 the proceeds to operation 422, where the root cause identification component 210 initiates remedial action 222 to address the identified root cause, such as those actions described above. The routine 400 then proceeds from operation 422 to operation 424, where it ends.

Figure 5:
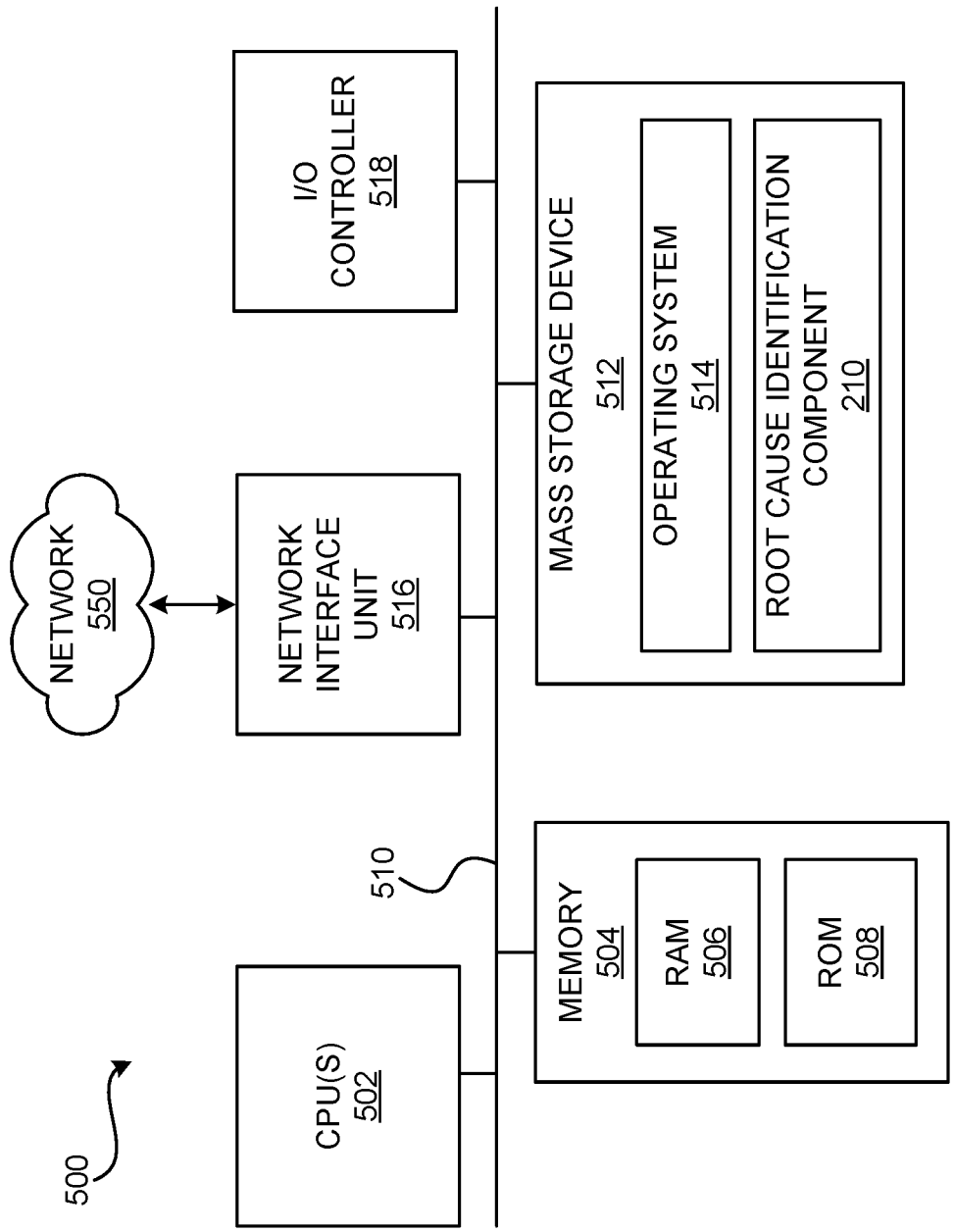
FIG. 5 is a computer architecture diagram illustrating aspects of an example computer architecture for a computer capable of executing the software components described herein.

FIG. 5 shows additional details of an example computer architecture for a computer capable of providing the functionality described herein such as, for example, a computing device configured to implement the functionality described above with reference to FIGS. 1-4. Thus, the computer architecture 500 illustrated in FIG. 5 illustrates an architecture for a server computer or another type of computing device suitable for implementing the functionality described herein. The computer architecture 500 might be utilized to execute the various software components presented herein to implement the disclosed technologies.

The computer architecture 500 illustrated in FIG. 5 includes a central processing unit (CPU 502), a system memory 504, including a random-access memory (RAM 506) and a read-only memory (ROM 508), and a system bus 510 that couples the memory 504 to the CPU 502. A firmware containing basic routines that help to transfer information between elements within the computer architecture 500, such as during startup, is stored in the ROM 508. The computer architecture 500 further includes a mass storage device 512 for storing an operating system 514, other data, and one or more application programs, such as the root cause identification component 210.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various implementations, the computer architecture 500 might operate in a networked environment using logical connections to remote computers through a network 550 and/or another network (not shown). A computing device implementing the computer architecture 500 might connect to the network 550 through a network interface unit 516 connected to the bus 510. It should be appreciated that the network interface unit 516 might also be utilized to connect to other types of networks and remote computer systems.

The computer architecture 500 might also include an input/output controller 518 for receiving and processing input from a number of other devices, including a keyboard, mouse, or electronic stylus (not shown in FIG. 5). Similarly, the input/output controller 518 might provide output to a display screen, a printer, or other type of output device (also not shown in FIG. 5). It should also be appreciated that via a connection to the network 550 through a network interface unit 516, the computing architecture might enable the root cause identification component 210 to be distributed.

It should be appreciated that the software components described herein might, when loaded into the CPU 502 and executed, transform the CPU 502 and the overall computer architecture 500 from a general-purpose computing system into a special-purpose computing system customized to facilitate the functionality presented herein. The CPU 502 might be constructed from any number of transistors or other discrete circuit elements, which might individually or collectively assume any number of states. More specifically, the CPU 502 might operate as a finite-state machine, in response to executable instructions contained within the software modules disclosed herein. These computer-executable instructions might transform the CPU 502 by specifying how the CPU 502 transitions between states, thereby transforming the transistors or other discrete hardware elements constituting the CPU 502.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 might include other types of computing devices, including hand-held computers, embedded computer systems, personal digital assistants, and other types of computing devices known to those skilled in the art.

It is also contemplated that the computer architecture 500 might not include all of the components shown in FIG. 5, might include other components that are not explicitly shown in FIG. 5, or might utilize an architecture completely different than that shown in FIG. 5. For example, and without limitation, the technologies disclosed herein can be utilized with multiple CPUS for improved performance through parallelization, graphics processing units ("GPUs") for faster computation, and/or tensor processing units ("TPUs") for implementing big data applications. The term "processor" as used herein encompasses CPUs, GPUs, and TPUs.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   retrieving a primary dataset and a plurality of secondary datasets, the primary dataset comprising data points for a primary metric, and the plurality of secondary datasets comprising data points for a plurality of secondary metrics;
   identifying a time window based on the primary dataset;
   computing an interpolant for data points in the time window for one or more of the plurality of secondary datasets, the interpolant corresponding to an anomaly impacting operation of one or more components of a computing system; and
   performing, on the one or more components, a remedial action for the anomaly, the remedial action restoring the operation of the one or more components.

2. The method of claim 1, further comprising computing an impact score for each of the plurality of secondary metrics based on the interpolant.

3. The method of claim 2, wherein the impact score comprises a standard deviation of derivatives of the interpolant during the time window.

4. The method of claim 2, further comprising selecting a set of secondary metrics from the plurality of secondary metrics based on respective impact scores.

5. The method of claim 1, further comprising identifying a cause of the anomaly impacting operation of the one or more components.

6. The method of claim 5, wherein the remedial action addresses the cause of the anomaly.

7. The method of claim 1, wherein the remedial action includes one or more of restoring, rebooting, reconfiguring, or initializing the computing system.

8. The method of claim 1, wherein the remedial action includes restoring, rebooting, initializing, or reconfiguring the one or more components.

9. The method of claim 1, further comprising transmitting an alert to an associated administrator of the computing system.

10. The method of claim 1, further comprising:
    receiving an indication of the anomaly at the computing system; and
    retrieving the primary dataset and the plurality of secondary datasets based on the indication.

11. A computing system, comprising:
    one or more processors; and
    a computer-readable storage medium having computer-executable instructions stored thereupon which, when executed by the one or more processors, cause the one or more processors to:
      retrieve a primary dataset and a plurality of secondary datasets, the primary dataset comprising data points for a primary metric, and the plurality of secondary datasets comprising data points for a plurality of secondary metrics;
      identify a time window based on the primary dataset;
      compute an interpolant for data points in the time window for each of the plurality of secondary datasets, one or more of the interpolants corresponding to an anomaly impacting operation of one or more components of the computing system; and
      perform, on the one or more components, a remedial action for the anomaly, the remedial action restoring the operation of the one or more components.

12. The computing system of claim 11, further comprising computing an interpolant for the data points in the primary dataset by fitting a cubic polynomial through the data points for the primary metric.

13. The computing system of claim 11, wherein the interpolant for the data points in the time window for each of the plurality of secondary datasets are computed by fitting a cubic polynomial through the data points for the plurality of secondary metrics.

14. The computing system of claim 11, wherein identifying the time window comprises evaluating roots of a derivative of an interpolant for the data points in the primary dataset.

15. The computing system of claim 11, wherein the data points for the primary metric and the data points for the plurality of secondary metrics are collected during a time period corresponding to the anomaly detected at the computing system.

16. The computing system of claim 11, further comprising computing an impact score for each of the plurality of secondary metrics based on the interpolant for each of the plurality of secondary datasets.

17. A computer-readable storage medium having computer-executable instructions stored thereupon which, when executed by a processor, cause the processor to:
    retrieve a primary dataset and a plurality of secondary datasets, the primary dataset comprising data points for a primary metric, and the plurality of secondary datasets comprising data points for a plurality of secondary metrics;
    identify a time window based on the primary dataset;
    compute a secondary interpolant for data points in the time window for each of the plurality of secondary datasets, one or more of the secondary interpolants corresponding to an anomaly impacting operation of one or more components of a computing system; and
    perform, on the one or more components, a remedial action for the anomaly, the remedial action restoring the operation of the one or more components.

18. The computer-readable storage medium of claim 17, wherein the time window is identified by evaluating roots of a derivative of an interpolant for the primary dataset.

19. The computer-readable storage medium of claim 17, wherein the data points for the primary metric and the data points for the plurality of secondary metrics are collected during a time period corresponding to the anomaly detected at the computing system.

20. The computer-readable storage medium of claim 17, wherein the remedial action includes restoring, rebooting, initializing, or reconfiguring the one or more components.

* * * * *